US012762432B2

(12) United States Patent
Lahtinen

(10) Patent No.: US 12,762,432 B2
(45) Date of Patent: Oct. 13, 2026

(54) SYSTEM AND METHOD FOR FAST ANNOTATION OF DATASET WITH CONSTRAINT PROPAGATION

(71) Applicant: JPMorgan Chase Bank, N.A., New York, NY (US)

(72) Inventor: Jani Lahtinen, Glasgow City (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 711 days.

(21) Appl. No.: 18/195,630

(22) Filed: May 10, 2023

(65) Prior Publication Data

US 2024/0378462 A1 Nov. 14, 2024

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS

| | | | | |
|---|---|---|---|---|
| 10,726,041 | B1 * | 7/2020 | Segler, Jr. | G06F 16/9024 |
| 11,921,768 | B1 * | 3/2024 | Ganesh | G06N 3/02 |
| 2016/0162562 | A1 * | 6/2016 | Hattori | G06F 16/21 707/620 |
| 2019/0361966 | A1 * | 11/2019 | Munro | G06F 16/24532 |

OTHER PUBLICATIONS

Chai, Chengliang, and Guoliang Li. "Human-in-the-loop Techniques in Machine Learning." IEEE Data Eng. Bull. 43.3 (2020): 37-52. (Year: 2020).*

Rendle et al., "Active Learning of Equivalence Relations by Minimizing the Expected Loss Using Constraint Inference," 2008 Eighth IEEE International Conference on Data Mining, pp. 1001-1006, Dec. 15, 2008.

Liang et al., "Active Learning of Strict Partial Orders: A Case Study on Concept Prerequisite Relations," The 12th International Conference on Educational Data Mining, Michel Desmarais, Collin F. Lynch, Agathe Merceron, & Roger Nkambou (eds.), pp. 348-353, EDM 2019.

* cited by examiner

*Primary Examiner* — Kevin W Figueroa
(74) *Attorney, Agent, or Firm* — GREENBLUM & BERNSTEIN, P.L.C.

(57) ABSTRACT

Various methods, apparatuses/systems, and media for annotating an unlabeled dataset with constraint propagation are disclosed. A processor queries, by utilizing a user interface, a machine learning data model to fetch an unlabeled dataset; annotates the unlabeled dataset by labeling pairs of examples which are labeled with binary "YES" or "No" answers; generates, in response to annotating the unlabeled dataset, an annotated labeled dataset having annotated examples; propagates constraints based on a preconfigured rule in a manner such that a user can go back to previously annotated examples from the annotated labeled dataset; labels the previously annotated examples correctly when the user determines that the previously annotated examples are mis-labeled; and automatically trains the machine learning data model with correct labeling of the annotated examples.

19 Claims, 7 Drawing Sheets

200

200

300

500

600a

600b

600c

600d

SYSTEM AND METHOD FOR FAST ANNOTATION OF DATASET WITH CONSTRAINT PROPAGATION

TECHNICAL FIELD

This disclosure generally relates to data processing, and, more particularly, to methods and apparatuses for implementing a platform, language, cloud, and database agnostic smart data annotation module configured to annotate a dataset quickly and efficiently with constraint propagation and start a modeling process.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data monitoring, customer help, performance analysis, project tracking, and competitive analysis, to name but a few. In general, large enterprises, corporations, agencies, institutions, and other organizations are facing a continuing problem of handling, processing, and/or accurately describing a vast amount of unlabeled dataset that are crucial to plan actions and help customers.

For example, news analytics at a large corporation may provide over 100,000 articles per day (restricting it to a subset of more "reliable sources" 10,000 articles per day) having a larger number of unlabeled dataset. Ongoing support and maintenance by utilizing conventional tools to annotate that larger number of unlabeled dataset has traditionally been a cumbersome, time consuming and expensive endeavor especially for large scale enterprise digital solutions that must analyze and annotate at least a subset of dataset that are generated from more "reliable sources" articles per day (i.e., at least 10,000 articles). Currently, there appears to be no tool that can quickly and efficiently label such unlabeled dataset with constraint propagation and start a modeling process that can help in clustering or ranking type of tasks necessary for planning actions and helping customers.

Moreover, conventional applied machine learning tasks may have either no labelled data or the available data is not quite labelled according to the application at hand. It appears to be a common modern approach to fine tune an existing large model to better fit a local problem. An example of such a task may include fine tuning a large language model for text classification. Another task may include a model evaluation when a user wants to see how the system built on historical data behaves under current input, which may also involve extracting data, labelling it, or simply looking current examples and labelling them as correct or incorrect. However, these conventional tasks may not provide a unified platform to provide a minimal interface to quickly annotate a dataset with binary labels (Yes/No). Although these conventional tasks may allow some level of data annotation capabilities, they fail to allow a user to go back to previously annotated examples if the user determines that the previously annotated examples were mis-labeled.

Thus, there is a need for an advanced tool that can address these conventional shortcomings corresponding to annotation of unlabeled dataset.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic smart data annotation module configured to annotate a dataset quickly and efficiently with constraint propagation and start a modeling process, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, database, and cloud agnostic smart data annotation module configured to implement a minimal interface to quickly annotate a dataset with binary labels (Yes/No). According to exemplary embodiments, the smart data annotation module may be paired with an active learning model so that the smart data annotation module may be configured to output examples which may prove to be most useful to train the model. In addition, for the modeling tasks, such as clustering, which may be annotated by pairwise comparison of examples, the smart data annotation module may, according to exemplary embodiments, may be configured to implement reversible constraint propagation so that a user may go back to previously annotated examples and label them correctly if the user determines that the previously annotated examples were mis-labeled, but the disclosure is not limited thereto.

According to exemplary embodiments, a method for annotating an unlabeled dataset with constraint propagation by utilizing one or more processors along with allocated memory is disclosed. The method may include: receiving, by a machine learning data model, an unlabeled dataset; querying, by utilizing a user interface, the machine learning data model to fetch the unlabeled dataset; annotating the unlabeled dataset by labeling pairs of examples which are labeled with binary "YES" or "No" answers; generating, in response to annotating the unlabeled dataset, an annotated labeled dataset having annotated examples; propagating constraints based on a preconfigured rule in a manner such that a user can go back to previously annotated examples from the annotated labeled dataset; labeling the previously annotated examples correctly when the user determines that the previously annotated examples are mis-labeled; and automatically training the machine learning data model with correct labeling of the annotated examples.

According to exemplary embodiments, the method may further include: filtering out duplicate examples from the unlabeled dataset prior to annotating the unlabeled dataset.

According to exemplary embodiments, the method may further include: filtering out non-English prose from the unlabeled dataset prior to annotating the unlabeled dataset.

According to exemplary embodiments, in annotating the unlabeled dataset, the method may further include: determining whether examples presented in the unlabeled dataset belong to same class or not; and annotating the examples accordingly when it is determined that the examples presented in the unlabeled dataset belong to the same class.

According to exemplary embodiments, in annotating the unlabeled dataset, the method may further include: chaining multiple questions to generate multi-label annotations in a manner such that, based on an answer to a current question, the user can follow up with another question.

According to exemplary embodiments, in annotating the unlabeled dataset, the method may further include: generating default answers from the machine learning model.

According to exemplary embodiments, when it is determined that a certain default answer among the generated default answers is acceptable, the method may further include: fetching a default value corresponding to the default answer; storing the default value as a new default value; and propagating constraints based on the new default value.

According to exemplary embodiments, when it is determined that a certain default answer among the generated default answers is not acceptable, the method may further include: displaying a "Yes" or "No" icon onto the user interface to receive user input corresponding to the labeling pairs of examples as a new value; storing the new value as a new default value; and propagating constraints based on the new default value.

According to exemplary embodiments, the method may further include: implementing a caching algorithm to keep a dictionary of edges which are induced by an annotation in a manner such that when the user "undo" an annotated edge, the user can revert the edges that are induced by the edge.

According to exemplary embodiments, the method may further include: implementing an active learning algorithm to generate a next sample for annotation.

According to exemplary embodiments, the machine learning model may be a classification model.

According to exemplary embodiments, a system for annotating an unlabeled dataset with constraint propagation is disclosed. The system may include: a processor; and a memory operatively connected to the processor via a communication interface, the memory storing computer readable instructions, when executed, may cause the processor to: receive, by a machine learning data model, an unlabeled dataset; query, by utilizing a user interface, the machine learning data model to fetch the unlabeled dataset; annotate the unlabeled dataset by labeling pairs of examples which are labeled with binary "YES" or "No" answers; generate, in response to annotating the unlabeled dataset, an annotated labeled dataset having annotated examples; propagate constraints based on a preconfigured rule in a manner such that a user can go back to previously annotated examples from the annotated labeled dataset; label the previously annotated examples correctly when the user determines that the previously annotated examples are mis-labeled; and automatically train the machine learning data model with correct labeling of the annotated examples.

According to exemplary embodiments, the processor may be further configured to: filter out duplicate examples from the unlabeled dataset prior to annotating the unlabeled dataset.

According to exemplary embodiments, the processor may be further configured to: filter out non-English prose from the unlabeled dataset prior to annotating the unlabeled dataset.

According to exemplary embodiments, in annotating the unlabeled dataset, the processor may be further configured to: determine whether examples presented in the unlabeled dataset belong to same class or not; and annotate the examples accordingly when it is determined that the examples presented in the unlabeled dataset belong to the same class.

According to exemplary embodiments, in annotating the unlabeled dataset, the processor may be further configured to: chain multiple questions to generate multi-label annotations in a manner such that, based on an answer to a current question, the user can follow up with another question.

According to exemplary embodiments, in annotating the unlabeled dataset, the processor may be further configured to: generate default answers from the machine learning model.

According to exemplary embodiments, when it is determined that a certain default answer among the generated default answers is acceptable, the processor may be further configured to: fetch a default value corresponding to the default answer; store the default value as a new default value; and propagate constraints based on the new default value.

According to exemplary embodiments, when it is determined that a certain default answer among the generated default answers is not acceptable, the processor may be further configured to: display a "Yes" or "No" icon onto the user interface to receive user input corresponding to the labeling pairs of examples as a new value; store the new value as a new default value; and propagate constraints based on the new default value.

According to exemplary embodiments, the processor may be further configured to: implement a caching algorithm to keep a dictionary of edges which are induced by an annotation in a manner such that when the user "undo" an annotated edge, the user can revert the edges that are induced by the edge.

According to exemplary embodiments, the processor may be further configured to: implement an active learning algorithm to generate a next sample for annotation.

According to exemplary embodiments, a non-transitory computer readable medium configured to store instructions for annotating an unlabeled dataset with constraint propagation is disclosed. The instructions, when executed, may cause a processor to perform the following: receiving, by a machine learning data model, an unlabeled dataset; querying, by utilizing a user interface, the machine learning data model to fetch the unlabeled dataset; annotating the unlabeled dataset by labeling pairs of examples which are labeled with binary "YES" or "No" answers; generating, in response to annotating the unlabeled dataset, an annotated labeled dataset having annotated examples; propagating constraints based on a preconfigured rule in a manner such that a user can go back to previously annotated examples from the annotated labeled dataset; labeling the previously annotated examples correctly when the user determines that the previously annotated examples are mis-labeled; and automatically training the machine learning data model with correct labeling of the annotated examples.

According to exemplary embodiments, the instructions, when executed, may cause the processor to further perform the following: filtering out duplicate examples from the unlabeled dataset prior to annotating the unlabeled dataset.

According to exemplary embodiments, the instructions, when executed, may cause the processor to further perform the following: filtering out non-English prose from the unlabeled dataset prior to annotating the unlabeled dataset.

According to exemplary embodiments, in annotating the unlabeled dataset, the instructions, when executed, may cause the processor to further perform the following: determining whether examples presented in the unlabeled dataset belong to same class or not; and annotating the examples accordingly when it is determined that the examples presented in the unlabeled dataset belong to the same class.

According to exemplary embodiments, in annotating the unlabeled dataset, the instructions, when executed, may cause the processor to further perform the following: chaining multiple questions to generate multi-label annotations in a manner such that, based on an answer to a current question, the user can follow up with another question.

According to exemplary embodiments, in annotating the unlabeled dataset, the instructions, when executed, may cause the processor to further perform the following: generating default answers from the machine learning model.

According to exemplary embodiments, when it is determined that a certain default answer among the generated default answers is acceptable, the instructions, when executed, may cause the processor to further perform the following: fetching a default value corresponding to the default answer; storing the default value as a new default value; and propagating constraints based on the new default value.

According to exemplary embodiments, when it is determined that a certain default answer among the generated default answers is not acceptable, the instructions, when executed, may cause the processor to further perform the following: displaying a "Yes" or "No" icon onto the user interface to receive user input corresponding to the labeling pairs of examples as a new value; storing the new value as a new default value; and propagating constraints based on the new default value.

According to exemplary embodiments, the instructions, when executed, may cause the processor to further perform the following: implementing a caching algorithm to keep a dictionary of edges which are induced by an annotation in a manner such that when the user "undo" an annotated edge, the user can revert the edges that are induced by the edge.

According to exemplary embodiments, the instructions, when executed, may cause the processor to further perform the following: implementing an active learning algorithm to generate a next sample for annotation.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
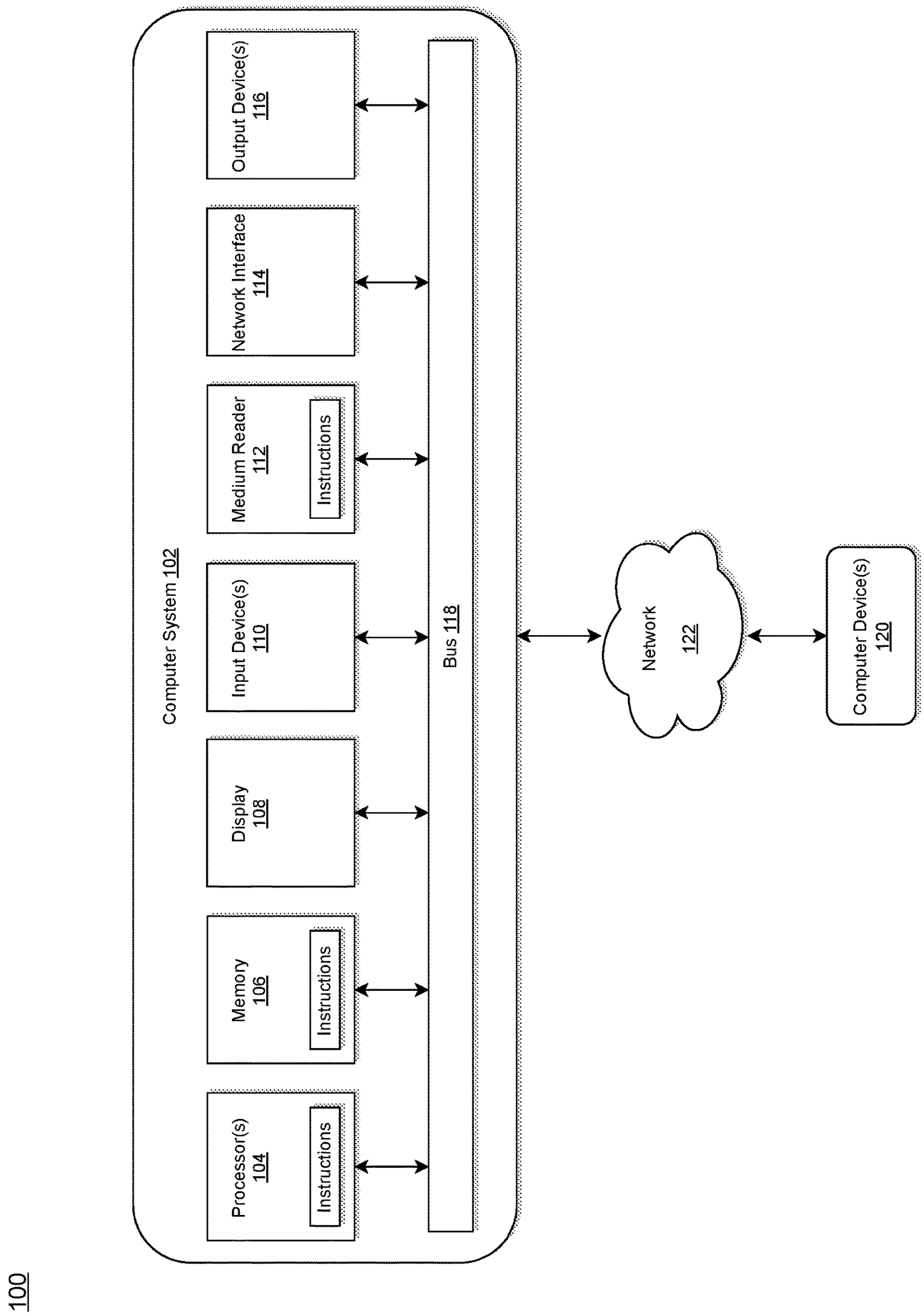
FIG. 1 illustrates a computer system for implementing a platform, language, database, and cloud agnostic smart data annotation module configured to annotate an unlabeled dataset with constraint propagation, process and procedures, and job aids in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic smart data annotation module configured to annotate a dataset quickly and efficiently automatically and dynamically with constraint propagation and start a modeling process in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the smart data annotation module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the smart data annotation module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
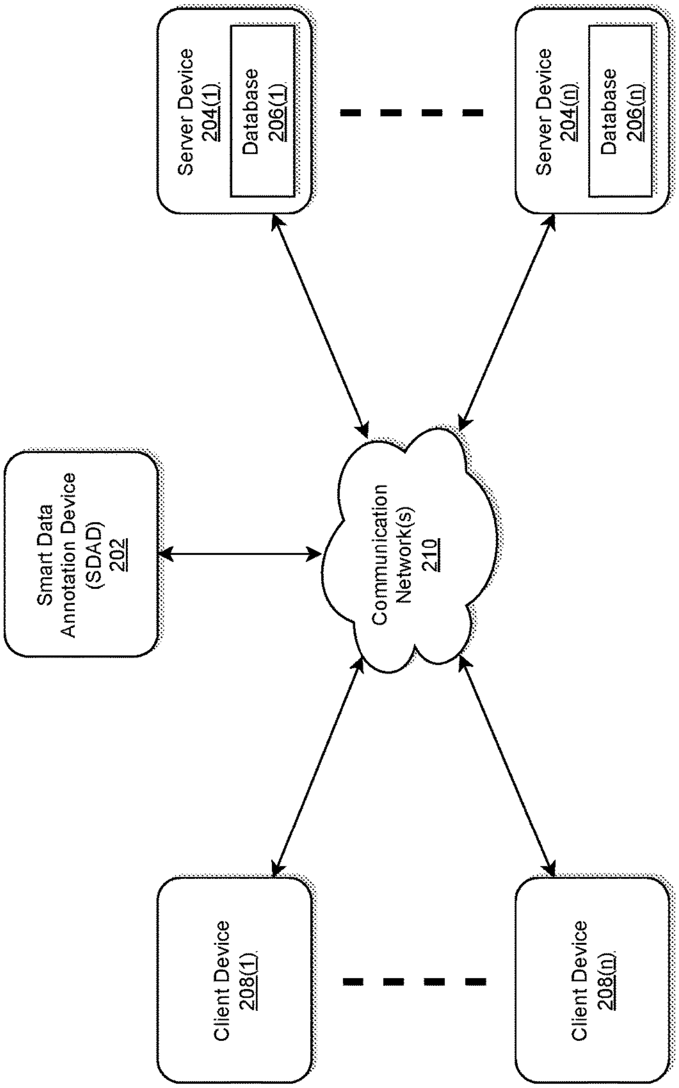
FIG. 2 illustrates an exemplary diagram of a network environment with a platform, language, database, and cloud agnostic smart data annotation device in accordance with an exemplary embodiment.

Referring to FIG. 2, a schematic of an exemplary network environment 200 for implementing a language, platform, database, and cloud agnostic smart data annotation device (SDAD) of the instant disclosure is illustrated.

According to exemplary embodiments, the above-described problems associated with conventional tools may be overcome by implementing an SDAD 202 as illustrated in FIG. 2 that may be configured for implementing a platform, language, database, and cloud agnostic smart data annotation module configured to automatically and dynamically annotate a dataset quickly and efficiently with constraint propagation and start a modeling process, but the disclosure is not limited thereto.

The SDAD 202 may be the same or similar to the computer system 102 as described with respect to FIG. 1.

The SDAD 202 may store one or more applications that can include executable instructions that, when executed by the SDAD 202, cause the SDAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDAD 202 itself, may be located in virtual server(s) running in a cloud-based computing environment rather than being tied to one or more specific physical network computing devices. Also, the application(s) may be running on one or more virtual machines (VMs) executing on the SDAD 202. Additionally, in one or more embodiments of this technology, virtual machine(s) running on the SDAD 202 may be managed or supervised by a hypervisor.

In the network environment 200 of FIG. 2, the SDAD 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the SDAD 202, such as the network interface 114 of the computer system 102 of FIG. 1, operatively couples and communicates between the SDAD 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDAD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDAD 202 may be a standalone device or integrated with one or more other devices or apparatuses, such as one or more of the server devices 204(1)-204(*n*), for example. In one particular example, the SDAD 202 may be hosted by one of the server devices 204(1)-204(*n*), and other arrangements are also possible. Moreover, one or more of the devices of the SDAD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the SDAD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the SDAD 202 that may efficiently provide a platform for implementing a platform, language, database, and cloud agnostic smart data annotation module configured to automatically and dynamically annotate a dataset quickly and efficiently with constraint propagation and start a modeling process, but the disclosure is not limited thereto.

The client devices 208(1)-208(*n*) may run interface applications, such as standard web browsers or standalone client applications, which may provide an interface to communicate with the SDAD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SDAD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SDAD 202, the server devices 204(1)-204(*n*), or the client devices 208(1)-208(*n*), for example, may be configured to operate as virtual instances on the same physical machine. For example, one or more of the SDAD 202, the server devices 204(1)-204(*n*), or the client devices 208(1)-208(*n*) may operate on the same physical device rather than as separate devices communicating through communication network(s) 210. Additionally, there may be more or fewer SDADs 202, server devices 204(1)-204(*n*), or client devices 208(1)-208(*n*) than illustrated in FIG. 2. According to exemplary embodiments, the SDAD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
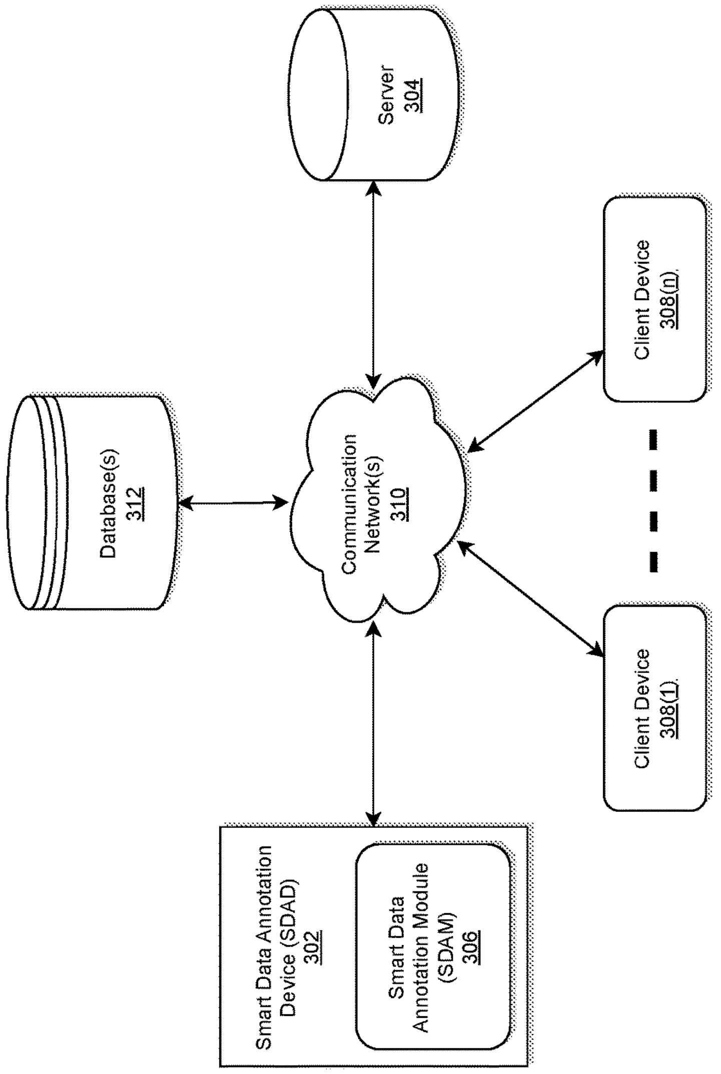
FIG. 3 illustrates a system diagram for implementing a platform, language, database, and cloud agnostic smart data annotation device having a platform, language, database, and cloud agnostic smart data annotation module in accordance with an exemplary embodiment.

FIG. 3 illustrates a system diagram for implementing a platform, language, and cloud agnostic SDAD having a platform, language, database, and cloud agnostic smart data annotation module (SDAM) in accordance with an exemplary embodiment.

As illustrated in FIG. 3, the system 300 may include an SDAD 302 within which an SDAM 306 is embedded, a server 304, a database(s) 312, a plurality of client devices 308(1) . . . 308(*n*), and a communication network 310.

According to exemplary embodiments, the SDAD 302 including the SDAM 306 may be connected to the server 304, and the database(s) 312 via the communication network 310. The SDAD 302 may also be connected to the plurality of client devices 308(1) . . . 308(*n*) via the communication network 310, but the disclosure is not limited thereto.

According to exemplary embodiment, the SDAD 302 is described and shown in FIG. 3 as including the SDAM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SDAM 306 may be configured to receive real-time feed of data from the plurality of client devices 308(1) . . . 308(*n*) and secondary sources via the communication network 310.

As may be described below, the SDAM 306 may be configured to: receive, by a machine learning data model, an unlabeled dataset; query, by utilizing a user interface, the machine learning data model to fetch the unlabeled dataset; annotate the unlabeled dataset by labeling pairs of examples which are labeled with binary "YES" or "No" answers; generate, in response to annotating the unlabeled dataset, an annotated labeled dataset having annotated examples; propagate constraints based on a preconfigured rule in a manner such that a user can go back to previously annotated examples from the annotated labeled dataset; label the previously annotated examples correctly when the user determines that the previously annotated examples are mislabeled; and automatically train the machine learning data model with correct labeling of the annotated examples, but the disclosure is not limited thereto.

The plurality of client devices 308(1) . . . 308(*n*) are illustrated as being in communication with the SDAD 302. In this regard, the plurality of client devices 308(1) . . . 308(*n*) may be "clients" (e.g., customers) of the SDAD 302 and are described herein as such. Nevertheless, it is to be known and understood that the plurality of client devices 308(1) . . . 308(*n*) need not necessarily be "clients" of the SDAD 302, or any entity described in association therewith herein. Any additional or alternative relationship may exist between either or both of the plurality of client devices 308(1) . . . 308(*n*) and the SDAD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the SDAD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The SDAD 302 may be the same or similar to the SDAD 202 as described with respect to FIG. 2, including any features or combination of features described with respect thereto.

Figure 4:
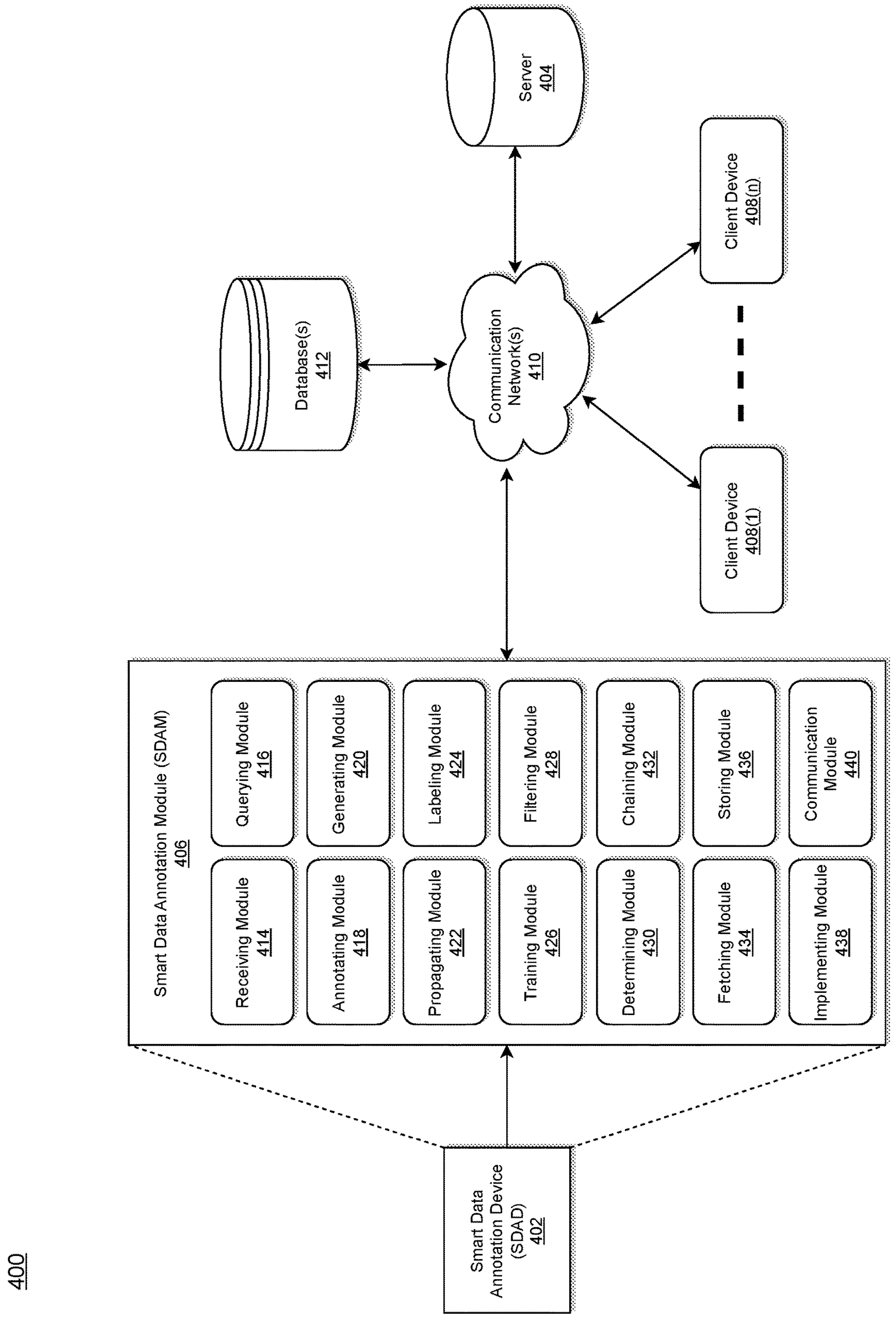
FIG. 4 illustrates a system diagram for implementing a platform, language, database, and cloud agnostic smart data annotation module of FIG. 3 in accordance with an exemplary embodiment.

FIG. 4 illustrates a system diagram for implementing a platform, language, database, and cloud agnostic SDAM of FIG. 3 in accordance with an exemplary embodiment.

According to exemplary embodiments, the system 400 may include a platform, language, database, and cloud agnostic SDAD 402 within which a platform, language, database, and cloud agnostic SDAM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the SDAD 402 including the SDAM 406 may be connected to the server 404 and the database(s) 412 via the communication network 410. The SDAD 402 may also be connected to the plurality of client devices 408(1)-408(*n*) via the communication network 410, but the disclosure is not limited thereto. The SDAM 406, the server 404, the plurality of client devices 408(1)-408(*n*), the database(s) 412, the communication network 410 as illustrated in FIG. 4 may be the same or similar to the SDAM 306, the server 304, the plurality of client devices 308(1)-308(*n*), the database(s) 312, the communication network 310, respectively, as illustrated in FIG. 3.

According to exemplary embodiments, as illustrated in FIG. 4, the SDAM 406 may include a receiving module 414, a querying module 416, an annotating module 418, a generating module 420, a propagating module 422, a labeling module 424, a training module 426, a filtering module 428, a determining module 430, a chaining module 432, a fetching module 434, a storing module 436, an implementing module 438, and a communication module 440. According to exemplary embodiments, interactions and data exchange among these modules included in the SDAM 406 provide the advantageous effects of the disclosed invention. Functionalities of each module of FIG. 4 may be described in detail below with reference to FIGS. 4-7.

According to exemplary embodiments, each of the receiving module 414, querying module 416, annotating module 418, generating module 420, propagating module 422, labeling module 424, training module 426, filtering module 428, determining module 430, chaining module 432, fetching module 434, storing module 436, implementing module 438, and the communication module 440 of the SDAM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, querying module 416, annotating module 418, generating module 420, propagating module 422, labeling module 424, training module 426, filtering module 428, determining module 430, chaining module 432, fetching module 434, storing module 436, implementing module 438, and the communication module 440 of the SDAM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, querying module 416, annotating module 418, generating module 420, propagating module 422, labeling module 424, training module 426, filtering module 428, determining module 430, chaining module 432, fetching module 434, storing module 436, implementing module 438, and the communication module 440 of the SDAM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, querying module 416, annotating module 418, generating module 420, propagating module 422, labeling module 424, training module 426, filtering module 428, determining module 430, chaining module 432, fetching module 434, storing module 436, implementing module 438, and the communication module 440 of the SDAM 406 of FIG. 4 may be called via corresponding API.

According to exemplary embodiments, the process implemented by the SDAM 406 may be executed via the communication module 440 and the communication network 410, which may comprise plural networks as described above. For example, in an exemplary embodiment, the various components of the SDAM 406 may communicate with the server 404, and the database(s) 412 via the communication module 440 and the communication network 410 and the results may be displayed onto the GUI 434. Of course, these embodiments are merely exemplary and are not limiting or exhaustive. The database(s) 412 may include the databases included within the private cloud and/or public cloud and the server 404 may include one or more servers within the private cloud and the public cloud.

News analytics at a large corporation may provide over 100,000 articles per day (restricting it to a subset of more "reliable sources" 10,000 articles per day) having a larger number of unlabeled dataset. Ongoing support and maintenance by utilizing conventional tools to annotate that larger number of unlabeled dataset has traditionally been a cumbersome, time consuming and expensive endeavor especially for large scale enterprise digital solutions that must analyze and annotate at least a subset of dataset that are generated from more "reliable sources" articles per day (i.e., at least 10,000 articles). Currently, there appears to be no tool that can quickly and efficiently label such unlabeled dataset with constraint propagation and start a modeling process that can help in clustering or ranking type of tasks necessary for planning actions and helping customers.

According to exemplary embodiments, the SDAM 406 may be configured to implement a minimal interface to quickly annotate the dataset with binary labels (Yes/No). According to exemplary embodiments, the SDAM 406 may be paired with an active learning model so that the smart data annotation module may be configured to output examples which may prove to be most useful to train the model. In addition, for the modeling tasks, such as clustering, which may be annotated by pairwise comparison of examples, the SDAM 406 may, according to exemplary embodiments, may be configured to implement reversible constraint propagation so that a user may go back to previously annotated examples and label them correctly if the user determines that the previously annotated examples were mis-labeled, but the disclosure is not limited thereto.

For example, according to exemplary embodiments, the receiving module 414 causes a machine learning data model to receive, the unlabeled dataset. The querying module 416 may be configured to query, by utilizing a user interface (not shown, but may be embedded within the SDAD 402 or the client device 408(1)-408(*n*), the machine learning data model to fetch the unlabeled dataset. The annotating module 418 may be configured to annotate the unlabeled dataset by labeling pairs of examples which are labeled with binary "YES" or "No" answers. The generating module 420 may be configured to generate, in response to annotating the unlabeled dataset, an annotated labeled dataset having annotated examples. The propagating module 422 may be configured to propagate constraints based on a preconfigured rule in a manner such that a user can go back to previously annotated examples from the annotated labeled dataset. The labeling module 424 may be configured to label the previously annotated examples correctly when the user determines that the previously annotated examples are mis-labeled. The training module 426 may be configured to automatically train the machine learning data model with the correct labeling of the annotated examples.

According to exemplary embodiments, the filtering module 428 may be configured to filter out duplicate examples from the unlabeled dataset prior to annotating the unlabeled dataset.

According to exemplary embodiments, the filtering module 428 may be further configured to filter out non-English prose from the unlabeled dataset prior to annotating the unlabeled dataset.

According to exemplary embodiments, in annotating the unlabeled dataset, the determining module 430 may be configured to determine whether examples presented in the unlabeled dataset belong to same class or not. The annotating module 418 may be configured to annotate the examples accordingly when it is determined that the examples presented in the unlabeled dataset belong to the same class.

According to exemplary embodiments, in annotating the unlabeled dataset, the chaining module 432 may be configured to chain multiple questions to generate multi-label annotations in a manner such that, based on an answer to a current question, the user can follow up with another question.

According to exemplary embodiments, in annotating the unlabeled dataset, the generating module 420 may be configured to generate default answers from the machine learning model.

According to exemplary embodiments, when it is determined that a certain default answer among the generated default answers is acceptable, the fetching module 434 may be configured to fetch a default value corresponding to the default answer. The storing module 436 may be configured to store the default value as a new default value; and the propagating module 422 may be configured to propagate constraints based on the new default value.

According to exemplary embodiments, when it is determined that a certain default answer among the generated default answers is not acceptable, the SDAM 406 may be configured to display a "Yes" or "No" icon onto the user interface to receive user input corresponding to the labeling pairs of examples as a new value; the storing module 436 may be configured to store the new value as a new default value; and the propagating module 422 may be configured to propagate constraints based on the new default value.

According to exemplary embodiments, the implementing module 438 may be configured to implement a caching algorithm to keep a dictionary of edges which are induced by an annotation in a manner such that when the user "undo" an annotated edge, the user can revert the edges that are induced by the edge.

According to exemplary embodiments, the implementing module 438 may be further configured to implement an active learning algorithm to generate the next sample for annotation.

According to exemplary embodiments, the machine learning model may be a classification model.

According to exemplary embodiments, the SDAM 406 may be configured to implement a process for pair annotation for deduplication. For example, two news articles may contain the same information. For example, the first news article from one source titled "U.S. News: Mortgage Rates Are Highest Since 2007" may contain the information as "Mortgage rates rose to their highest level in more than 15 years, a new high since the 2008-09 financial crisis that adds pressure to the already colling U.S. housing market." The second news article from another source titled "Mortgage Rates Rise to 6.7%, Highest Since 2007—Update" may contain the exact same information as the first news article, e.g., "Mortgage rates rose to their highest level in more than 15 years, a new high since the 2008-09 financial crisis that adds pressure to the already colling U.S. housing market." The SDAM 406 may be configured to insert pair annotation for these two articles as duplicate by allowing a user to answer the question that is being displayed on the graphical user interface "Are these two documents the same?" for each item. The user can select an appropriate icon from the displayed icons of "Yes," "No," "Skip," "Back," and "Mark." In this example, the user can mark "Yes" since both articles include the same information.

According to exemplary embodiments, the SDAM 406 may be configured to implement a process for pair annotation for estimating the sentiment of a news article. For example, two news articles may contain "sentiment" information about a company. For example, a first news article from one source titled "Tesla Ordered To Recall More Than a Million Cars in The US" may contain more negative information about Tesla than a second news article from another source titled "11:20 EDT Tesla forecasting jump in Q4 output, growth, through 2023, Reuters reports." The SDAM 406 may be configured to insert pair annotation for "sentiment" for these two articles by allowing a user to answer the question that is being displayed on the graphical user interface "Is the first document more positive than the second for Tesla?" for each item. The user can select an appropriate icon from the displayed icons of "Yes," "No," "Skip," "Back," and "Mark." In this example, the user can mark "No" since the first news article contains more negative information about Tesla than the second news article. According to exemplary use case the sentiment information may be classified into five categories: Very Negative, Negative, Neutral, Positive, Very Positive, but the disclosure is not limited thereto.

Figure 5:
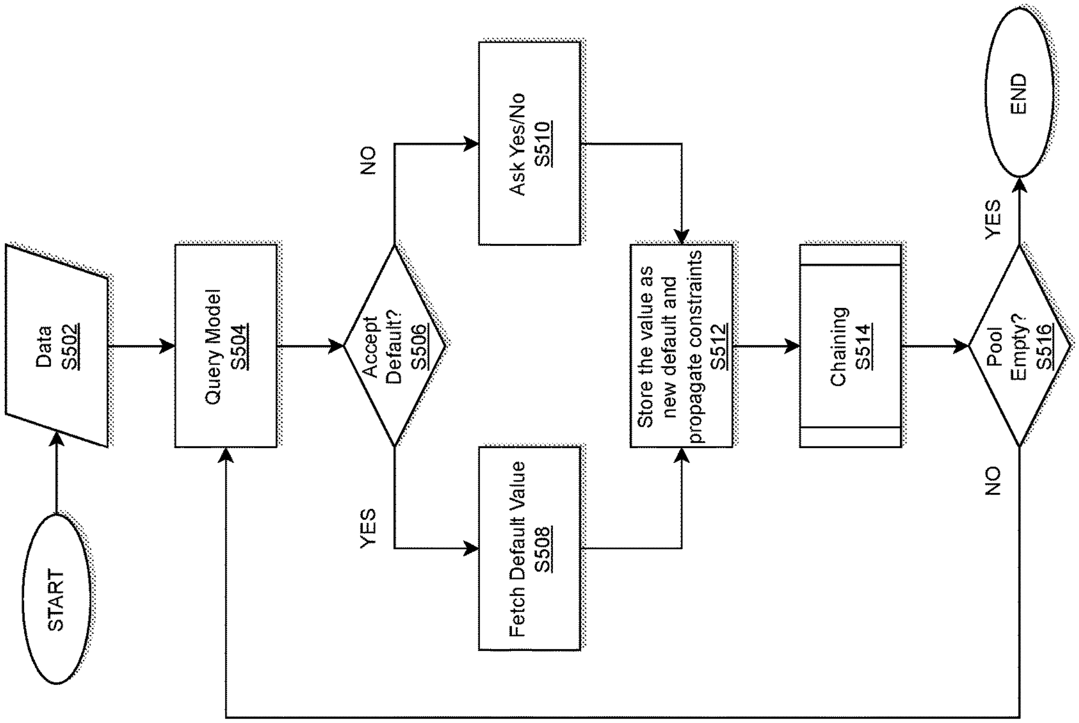
FIG. 5 illustrates an exemplary flow chart of a data annotation process as implemented by the platform, language, database, and cloud agnostic smart data annotation module of FIG. 4 in accordance with an exemplary embodiment.

FIG. 5 illustrates an exemplary flow chart of a data annotation process 500 as implemented by the platform, language, database, and cloud agnostic SDAM 406 of FIG. 4 in accordance with an exemplary embodiment. It may be appreciated that the illustrated process 700 and associated steps may be performed in a different order, with illustrated steps omitted, with additional steps added, or with a combination of reordered, combined, omitted, or additional steps.

FIG. 5 illustrates an efficient constraint propagation framework by using labeling pairs of examples which are labeled with "YES" or "No". The base framework asks the user (or an oracle) to answer yes or no to a specified question.

By using a set of logical premises, the data annotation process 500 can generate additional labels for each annotated pair of samples. Previous studies show that mental load of annotating is decreased by limiting the available choices to two, and this also renders into assigning truth values to logical propositions which we can use to propagate further values.

According to exemplary embodiments, the data annotation process 500 as implemented by the SDAM 406 may be configured to present an efficient caching strategy that can be used to go back to previous answers without rewinding all previous answers. For example, the data annotation process 500 may implement the caching by keeping a dictionary of the edges which were induced by an annotation. When a user "undo" an annotated edge, the data annotation process 500 simply reverts the edges that were induced by the edge.

For example, as illustrated in FIG. 5, at step S502, the process 500 may include receiving unannotated data.

At step S504, the process 500 may include querying a machine learning mode.

At step S506, the process 500 may include displaying a question as to whether to accept default value provided by the model with a binary "Yes" or "No" answers.

When the binary "Yes" is chosen, at step S508, the process 500 may include fetching the default value. When the binary "No" is chosen, at step S510, the process 500 may include not accepting the default value and asking another follow up question as disclosed above with a binary "Yes" or "No" answers for a new default value. At step S512, the process may include storing output values from both steps S508 and S510 onto a database as new default and propagating constraints. For example, constraints may be propagated based on given rules. For example, in learning equivalence classes the rules are using the standard Prolog-style notation: R(a,a); R(a,b):−R(b,a); and R(a,c):−R(a,b), R(b,c).

Figure 6A:
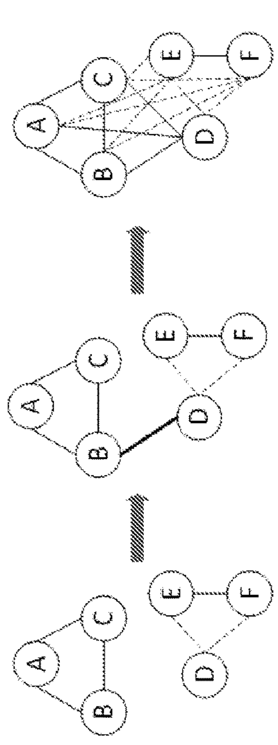
FIG. 6A illustrates an exemplary constraint propagation for positive equivalence inference as implemented by the platform, language, database, and cloud agnostic smart data annotation module of FIG. 4 in accordance with an exemplary embodiment.

For example, FIG. 6A illustrates an exemplary constraint propagation 600*a* for positive equivalence inference as implemented by the platform, language, database, and cloud agnostic SDAM 406 of FIG. 4 in accordance with an exemplary embodiment. In this example, the positive equivalence inference may be based on: Reflexivity: a=a; Symmetry: a=b iff b=a; and Transitivity: if a=b and b=c then a=c. As illustrated in FIG. 6A, "full line" is a Yes-edge, and "dashed line" is a No-edge. FIG. 6A illustrates a process of adding a Yes-edge among "B" and "D"; "B" and "C"; "A" and "D"; and "C" and "D".

Figure 6B:
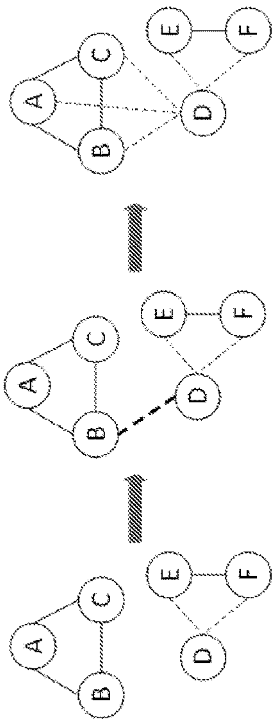
FIG. 6B illustrates an exemplary constraint propagation for negative equivalence inference as implemented by the platform, language, database, and cloud agnostic smart data annotation module of FIG. 4 in accordance with an exemplary embodiment.

FIG. 6B illustrates an exemplary constraint propagation 600*b* for negative equivalence inference as implemented by the platform, language, database, and cloud agnostic SDAM 406 of FIG. 4 in accordance with an exemplary embodiment. FIG. 6B illustrates a process of adding a No-edge among "B" and "D"; "A" and "D"; and "C" and "D".

Figure 6C:
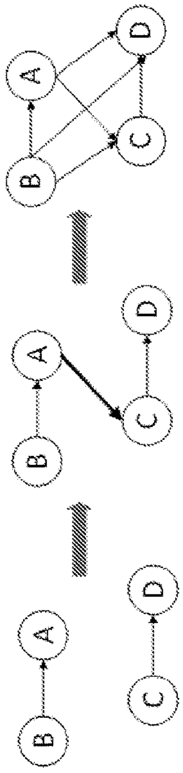
FIG. 6C illustrates an exemplary constraint propagation for positive ordering inference as implemented by the platform, language, database, and cloud agnostic smart data annotation module of FIG. 4 in accordance with an exemplary embodiment.

FIG. 6C illustrates an exemplary constraint propagation 600*c* for positive ordering inference as implemented by the platform, language, database, and cloud agnostic SDAM 406 of FIG. 4 in accordance with an exemplary embodiment. In this example, the positive equivalence inference may be based on: Irreflexivity: not a<a, i.e., no element is related to itself (also called anti-reflexive); Asymmetry: if a<b then not b<a (a>=b); and Transitivity: if a<b and b<c then a<c. As illustrated in FIG. 6C, "full line" is a Yes-edge, and "dashed line" is a No-edge. FIG. 6C illustrates a process of adding a Yes-edge among "B" and "C"; "B" and "D"; "B" and "A"; "A" and "C"; "A" and "D"; and "C" and "D".

Figure 6D:
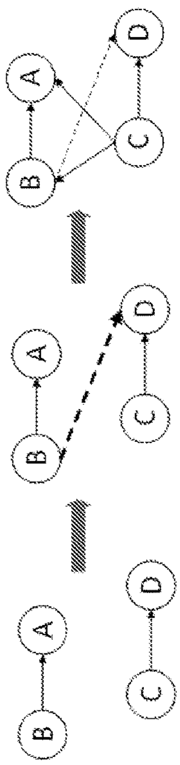
FIG. 6D illustrates an exemplary constraint propagation for negative equivalence inference as implemented by the platform, language, database, and cloud agnostic smart data annotation module of FIG. 4 in accordance with an exemplary embodiment.

FIG. 6D illustrates an exemplary constraint propagation 600*d* for negative equivalence inference as implemented by the platform, language, database, and cloud agnostic SDAM 406 of FIG. 4 in accordance with an exemplary embodiment. FIG. 6D illustrates a process of adding a No-edge among "B" and "D".

Referring back to FIG. 5, according to exemplary embodiments, at step S512, the process 500 may implement a constraint propagation speed up process by utilizing the following formula in case of equivalence classes: $o(N)\leq Q\leq o(N\text{\^{}}2)$, where N is the number of samples, and Q the number of queries. When considering partial ordering, these upper and lower bounds of sorting algorithms may be implemented by the process 500 for constraint propagation.

Referring back to FIG. 5, at step S514, the process 500 may include chaining multiple questions to generate multi-label annotations in a manner such that, based on an answer to a current question, the user can follow up with another question. According to exemplary embodiments, at step S514, the data annotation process 500 as implemented by the SDAM 406 may be configured to expand this binary framework into multi-label annotations by chaining, i.e., based on the answer to the current question, the SDAM 406 can allow a user to follow up with another question. For example, the data annotation process 500 as implemented by the SDAM 406 may be configured to ask a follow-up question based on the answer. A contrived example: if presented pictures of fruit the first question is "is this an apple?", and if the answer is "NO" the follow up question is "Is this an orange?", etc. to label different kinds of pictures of fruit.

According to exemplary embodiments, at step S514, the chaining process may include a binary "Yes" or "No" answering block for a user to answer the following question: "is there follow up questions for this sample?" When the user answers the question as "Yes," the chaining process moves to a step of "present the next question for the same sample" and the chaining process ends and the process moves to another decision block, step S516, of answering a binary "Yes" or "No" answers for choosing whether "Pool Empty?" According to exemplary embodiments, choosing an answer "Yes" for "Pool Empty" may mean that when a user is finished with the subset of news articles (pool of news articles) for annotation and if there are no more subsets are remained, then the process 500 ends. However, choosing an answer "No" for "Pool Empty" may mean that when a user is finished with the subset of news articles (pool of news articles) for annotation and there are more subsets are remained, then the process 500 moves to step S504 for querying the model again.

Figure 7:
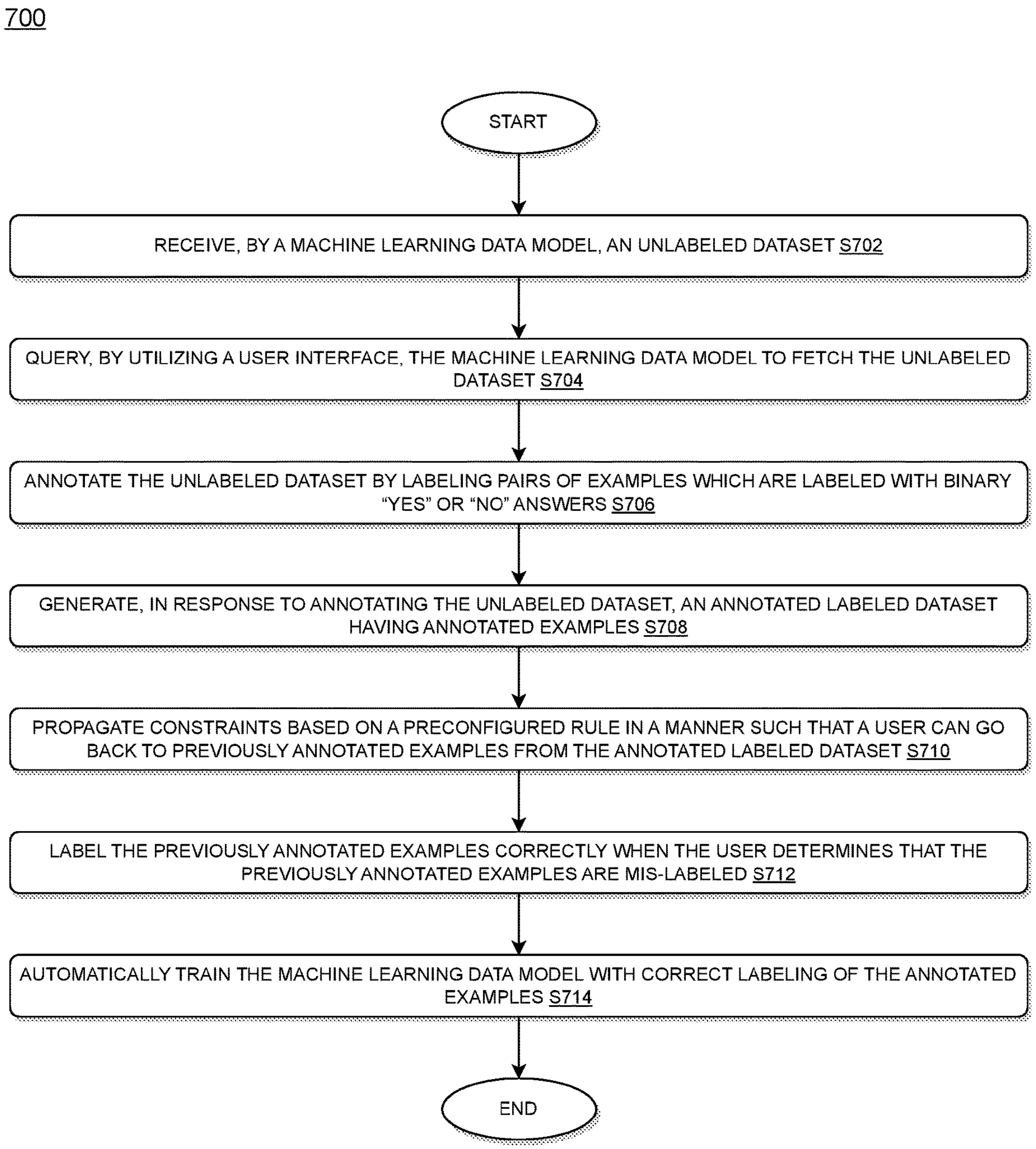
FIG. 7 illustrates another exemplary flow chart of a process implemented by the platform, language, database, and cloud agnostic smart data annotation module of FIG. 4 for automatically and dynamically annotating an unlabeled dataset with constraint propagation, in accordance with an exemplary embodiment.

FIG. 7 illustrates an exemplary flow chart of a process 700 implemented by the platform, language, database, and cloud agnostic SDAM 407 of FIG. 4 for automatically and dynamically annotating an unlabeled dataset with constraint propagation in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include receiving, by a machine learning data model, an unlabeled dataset.

At step S704, the process 700 may include querying, by utilizing a user interface, the machine learning data model to fetch the unlabeled dataset.

At step S706, the process 700 may include annotating the unlabeled dataset by labeling pairs of examples which are labeled with binary "YES" or "No" answers.

At step S708, the process 700 may include generating, in response to annotating the unlabeled dataset, an annotated labeled dataset having annotated examples.

At step S710, the process 700 may include propagating constraints based on a preconfigured rule in a manner such that a user can go back to previously annotated examples from the annotated labeled dataset.

At step S712, the process 700 may include labeling the previously annotated examples correctly when the user determines that the previously annotated examples are mislabeled.

At step S714, the process 700 may include automatically training the machine learning data model with correct labeling of the annotated examples.

According to exemplary embodiments, the process 700 may further include: filtering out duplicate examples from the unlabeled dataset prior to annotating the unlabeled dataset.

According to exemplary embodiments, the process 700 may further include: filtering out non-English prose from the unlabeled dataset prior to annotating the unlabeled dataset.

According to exemplary embodiments, in annotating the unlabeled dataset, the process 700 may further include: determining whether examples presented in the unlabeled dataset belong to same class or not; and annotating the examples accordingly when it is determined that the examples presented in the unlabeled dataset belong to the same class.

According to exemplary embodiments, in annotating the unlabeled dataset, the process 700 may further include: chaining multiple questions to generate multi-label annotations in a manner such that, based on an answer to a current question, the user can follow up with another question.

According to exemplary embodiments, in annotating the unlabeled dataset, the process 700 may further include: generating default answers from the machine learning model.

According to exemplary embodiments, when it is determined that a certain default answer among the generated default answers is acceptable, the process 700 may further include: fetching a default value corresponding to the default answer; storing the default value as a new default value; and propagating constraints based on the new default value.

According to exemplary embodiments, when it is determined that a certain default answer among the generated default answers is not acceptable, the process 700 may further include: displaying a "Yes" or "No" icon onto the user interface to receive user input corresponding to the labeling pairs of examples as a new value; storing the new value as a new default value; and propagating constraints based on the new default value.

According to exemplary embodiments, the process 700 may further include: implementing a caching algorithm to keep a dictionary of edges which are induced by an annotation in a manner such that when the user "undo" an annotated edge, the user can revert the edges that are induced by the edge.

According to exemplary embodiments, the process 700 may further include: implementing an active learning algorithm to generate next sample for annotation.

According to exemplary embodiments, in the process 700, the machine learning model may be a classification model, but the disclosure is not limited thereto.

According to exemplary embodiments, the SDAD 402 may include a memory (e.g., a memory 106 as illustrated in FIG. 1) which may be a non-transitory computer readable medium that may be configured to store instructions for implementing a platform, language, database, and cloud agnostic SDAM 406 for automatically and dynamically annotating an unlabeled dataset with constraint propagation as disclosed herein. The SDAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SDAM 406 or within the SDAD 402, may be used to perform one or more of the methods and processes as described herein. In a particular embodiment, the instructions may reside completely, or at least partially, within the memory 106, the medium reader 112, and/or the processor 104 (see FIG. 1) during execution by the SDAD 402.

According to exemplary embodiments, the instructions, when executed, may cause a processor embedded within the SDAM 406 or the SDAD 402 to perform the following: receiving, by a machine learning data model, an unlabeled dataset; querying, by utilizing a user interface, the machine learning data model to fetch the unlabeled dataset; annotating the unlabeled dataset by labeling pairs of examples which are labeled with binary "YES" or "No" answers; generating, in response to annotating the unlabeled dataset, an annotated labeled dataset having annotated examples: propagating constraints based on a preconfigured rule in a manner such that a user can go back to previously annotated examples from the annotated labeled dataset; labeling the previously annotated examples correctly when the user determines that the previously annotated examples are mislabeled; and automatically training the machine learning data model with correct labeling of the annotated examples. According to exemplary embodiments, the processor may be the same or similar to the processor 104 as illustrated in FIG. 1 or the processor embedded within the SDAD 202, SDAD 302, SDAD 402, and SDAM 406 which is the same or similar to the processor 104.

According to exemplary embodiments, the instructions, when executed, may cause the processor 104 to further perform the following: filtering out duplicate examples from the unlabeled dataset prior to annotating the unlabeled dataset.

According to exemplary embodiments, the instructions, when executed, may cause the processor 104 to further perform the following: filtering out non-English prose from the unlabeled dataset prior to annotating the unlabeled dataset.

According to exemplary embodiments, in annotating the unlabeled dataset, the instructions, when executed, may cause the processor 104 to further perform the following: determining whether examples presented in the unlabeled dataset belong to same class or not; and annotating the examples accordingly when it is determined that the examples presented in the unlabeled dataset belong to the same class.

According to exemplary embodiments, in annotating the unlabeled dataset, the instructions, when executed, may cause the processor 104 to further perform the following: chaining multiple questions to generate multi-label annotations in a manner such that, based on an answer to a current question, the user can follow up with another question.

According to exemplary embodiments, in annotating the unlabeled dataset, the instructions, when executed, may cause the processor 104 to further perform the following: generating default answers from the machine learning model.

According to exemplary embodiments, when it is determined that a certain default answer among the generated default answers is acceptable, the instructions, when executed, may cause the processor 104 to further perform the following: fetching a default value corresponding to the default answer; storing the default value as a new default value; and propagating constraints based on the new default value.

According to exemplary embodiments, when it is determined that a certain default answer among the generated default answers is not acceptable, the instructions, when executed, may cause the processor 104 to further perform the following: displaying a "Yes" or "No" icon onto the user interface to receive user input corresponding to the labeling pairs of examples as a new value; storing the new value as a new default value; and propagating constraints based on the new default value.

According to exemplary embodiments, the instructions, when executed, may cause the processor 104 to further perform the following: implementing a caching algorithm to keep a dictionary of edges which are induced by an annotation in a manner such that when the user "undo" an annotated edge, the user can revert the edges that are induced by the edge.

According to exemplary embodiments, the instructions, when executed, may cause the processor 104 to further perform the following: implementing an active learning algorithm to generate next sample for annotation.

According to exemplary embodiments as disclosed above in FIGS. 1-7, technical improvements effected by the instant disclosure may include a platform for implementing a platform, language, database, and cloud agnostic smart data annotation module configured to annotate a dataset quickly and efficiently automatically and dynamically with constraint propagation and start a modeling process, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for annotating an unlabeled dataset with constraint propagation by utilizing one or more processors along with allocated memory, the method comprising:

implementing a platform, language, cloud, and database agnostic smart data annotation module (SDAM), by an smart data annotation device (SDAD) executed by at least one processor, the SDAD being hosted on a cloud based network environment, wherein SDAM includes a receiving module, a querying module, an annotating module, a generating module, propagating module, labeling module, implementing module, and a training module, wherein each module being called via a corresponding application programming interface, and wherein the SDAM is paired with a machine learning data model so that the SDAM can output examples which are most useful to train the machine learning data model;

receiving, by the machine learning data model, an unlabeled dataset by calling the receiving module;

querying, by utilizing a user interface, the machine learning data model to fetch the unlabeled dataset by calling the querying module;

annotating, by calling the annotating module, the unlabeled dataset by labeling pairs of examples which are labeled with binary "YES" or "No" answers;

generating, in response to annotating the unlabeled dataset, by calling the generating module, an annotated labeled dataset having annotated examples;

propagating, by calling the propagating module, constraints based on a preconfigured rule in a manner such that a user can go back to previously annotated examples from the annotated labeled dataset;

labeling, by calling the labeling module, the previously annotated examples correctly when the user determines that the previously annotated examples are mis-labeled;

implementing, by calling the implementing module, a caching algorithm to keep a dictionary of edges which are induced by an annotation in a manner such that when the user "undo" an annotated edge, the user can revert the edges that are induced by the edge; and automatically training, by calling the training module, the machine learning data model with correct labeling of the annotated examples.

2. The method according to claim 1, further comprising: filtering out duplicate examples from the unlabeled dataset prior to annotating the unlabeled dataset.

3. The method according to claim 1, further comprising: filtering out non-English prose from the unlabeled dataset prior to annotating the unlabeled dataset.

4. The method according to claim 1, in annotating the unlabeled dataset, the method further comprising:

determining whether examples presented in the unlabeled dataset belong to same class or not; and annotating the examples accordingly when it is determined that the examples presented in the unlabeled dataset belong to the same class.

5. The method according to claim 1, in annotating the unlabeled dataset, the method further comprising:

chaining multiple questions to generate multi-label annotations in a manner such that, based on an answer to a current question, the user can follow up with another question.

6. The method according to claim 1, in annotating the unlabeled dataset, the method further comprising:

generating default answers from the machine learning model.

7. The method according to claim 6, when it is determined that a certain default answer among the generated default answers is acceptable, the method further comprising:

fetching a default value corresponding to the default answer;

storing the default value as a new default value; and propagating constraints based on the new default value.

8. The method according to claim 6, when it is determined that a certain default answer among the generated default answers is not acceptable, the method further comprising:

displaying a "Yes" or "No" icon onto the user interface to receive user input corresponding to the labeling pairs of examples as a new value;

storing the new value as a new default value; and propagating constraints based on the new default value.

9. The method according to claim 1, further comprising: implementing an active learning algorithm to generate a next sample for annotation.

10. The method according to claim 1, wherein the machine learning data model is a classification model.

11. A system for annotating an unlabeled dataset with constraint propagation, the system comprising:

a processor; and a memory operatively connected to the processor via a communication interface, the memory storing computer readable instructions, when executed, causes the processor to:

implement a platform, language, cloud, and database agnostic smart data annotation module (SDAM), by an smart data annotation device (SDAD) executed by at least one processor, the SDAD being hosted on a cloud based network environment, wherein SDAM includes a receiving module, a querying module, an annotating module, a generating module, propagating module, labeling module, implementing module, and a training module, wherein each module being called via a corresponding application programming interface, and wherein the SDAM is paired with a machine learning data model so that the SDAM can output examples which are most useful to train the machine learning data model;

receive, by the machine learning data model, an unlabeled dataset by calling the receiving module;

query, by utilizing a user interface, the machine learning data model to fetch the unlabeled dataset by calling the querying module;

annotate, by calling the annotating module, the unlabeled dataset by labeling pairs of examples which are labeled with binary "YES" or "No" answers;

generate, in response to annotating the unlabeled dataset, by calling the generating module, an annotated labeled dataset having annotated examples;

propagate, by calling the propagating module, constraints based on a preconfigured rule in a manner such that a user can go back to previously annotated examples from the annotated labeled dataset;

label, by calling the labeling module, the previously annotated examples correctly when the user determines that the previously annotated examples are mis-labeled;

implement, by calling the implementing module, a caching algorithm to keep a dictionary of edges which are induced by an annotation in a manner such that when the user "undo" an annotated edge, the user can revert the edges that are induced by the edge; and automatically train, by calling the training module, the machine learning data model with correct labeling of the annotated examples.

12. The system according to claim 11, wherein the processor is further configured to:

filter out duplicate examples from the unlabeled dataset prior to annotating the unlabeled dataset.

13. The system according to claim 11, wherein the processor is further configured to:

filter out non-English prose from the unlabeled dataset prior to annotating the unlabeled dataset.

14. The system according to claim 11, in annotating the unlabeled dataset, the processor is further configured to:

determine whether examples presented in the unlabeled dataset belong to same class or not; and annotate the examples accordingly when it is determined that the examples presented in the unlabeled dataset belong to the same class.

15. The system according to claim 11, in annotating the unlabeled dataset, the processor is further configured to:

chain multiple questions to generate multi-label annotations in a manner such that, based on an answer to a current question, the user can follow up with another question.

16. The system according to claim 11, in annotating the unlabeled dataset, the processor is further configured to:

generate default answers from the machine learning data model.

17. The system according to claim 16, when it is determined that a certain default answer among the generated default answers is acceptable, the processor is further configured to:

fetch a default value corresponding to the default answer;

store the default value as a new default value; and propagate constraints based on the new default value.

18. The system according to claim 16, when it is determined that a certain default answer among the generated default answers is not acceptable, the processor is further configured to:

display a "Yes" or "No" icon onto the user interface to receive user input corresponding to the labeling pairs of examples as a new value;

store the new value as a new default value; and propagate constraints based on the new default value.

19. A non-transitory computer readable medium configured to store instructions for annotating an unlabeled dataset with constraint propagation, the instructions, when executed, cause a processor to perform the following:

implementing a platform, language, cloud, and database agnostic smart data annotation module (SDAM), by an smart data annotation device (SDAD) executed by at least one processor, the SDAD being hosted on a cloud based network environment, wherein SDAM includes a receiving module, a querying module, an annotating module, a generating module, propagating module, labeling module, implementing module, and a training module, wherein each module being called via a corresponding application programming interface, and wherein the SDAM is paired with a machine learning data model so that the SDAM can output examples which are most useful to train the machine learning data model;

receiving, by the machine learning data model, an unlabeled dataset by calling the receiving module;

querying, by utilizing a user interface, the machine learning data model to fetch the unlabeled dataset by calling the querying module;

annotating, by calling the annotating module, the unlabeled dataset by labeling pairs of examples which are labeled with binary "YES" or "No" answers;

generating, in response to annotating the unlabeled dataset, by calling the generating module, an annotated labeled dataset having annotated examples;

propagating, by calling the propagating module, constraints based on a preconfigured rule in a manner such that a user can go back to previously annotated examples from the annotated labeled dataset;

labeling, by calling the labeling module, the previously annotated examples correctly when the user determines that the previously annotated examples are mis-labeled;

implementing, by calling the implementing module, a caching algorithm to keep a dictionary of edges which are induced by an annotation in a manner such that when the user "undo" an annotated edge, the user can revert the edges that are induced by the edge; and automatically training, by calling the training module, the machine learning data model with correct labeling of the annotated examples.

* * * * *